United States Patent Office.

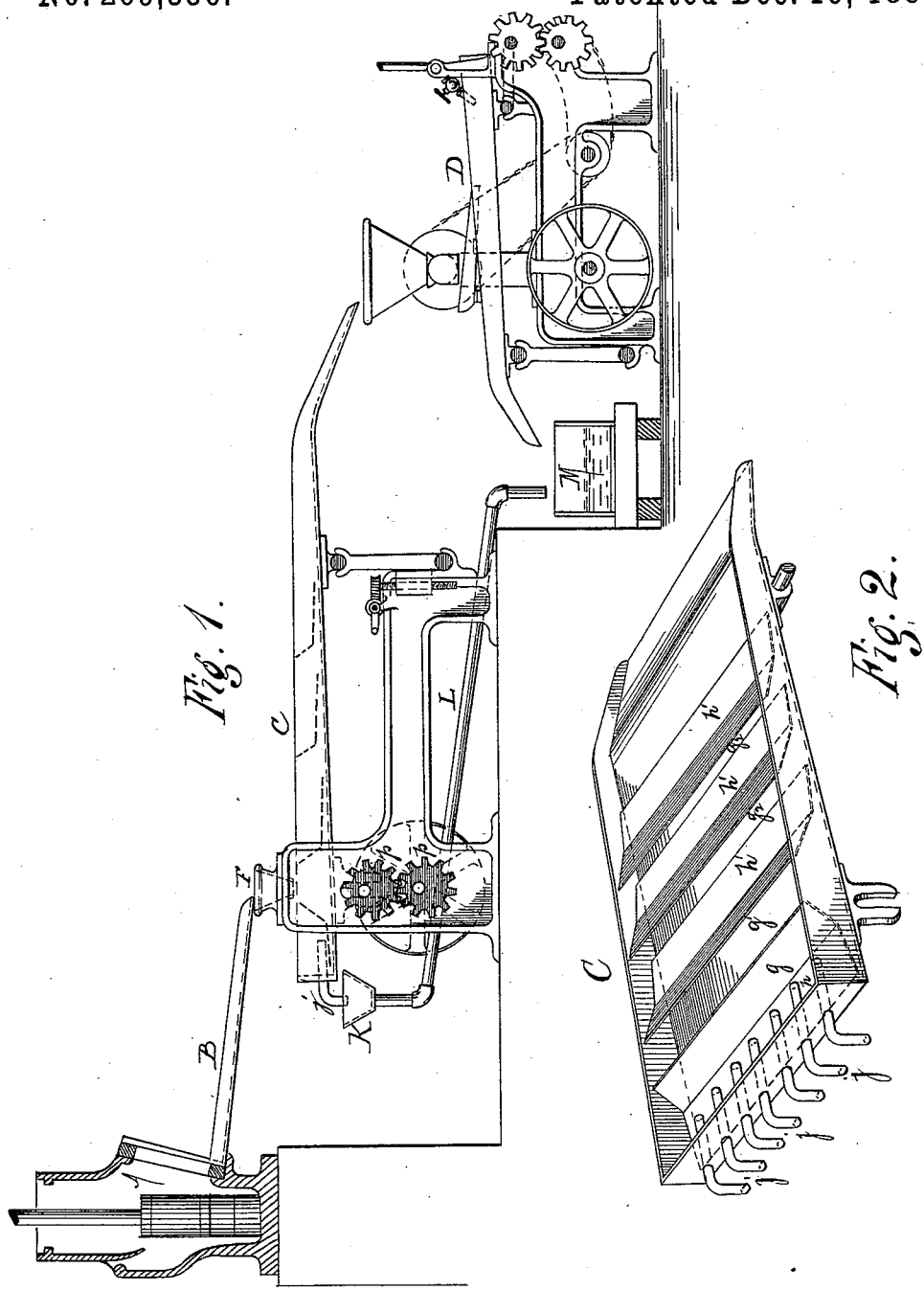

GEORGE W. WAITT, OF CAMDEN, NEW JERSEY, ASSIGNOR TO THE GOLDEN GATE CONCENTRATOR COMPANY, OF AUGUSTA, MAINE.

METHOD OF AND APPARATUS FOR CONCENTRATING AND AMALGAMATING ORES.

SPECIFICATION forming part of Letters Patent No. 269,356, dated December 19, 1882.

Application filed January 28, 1882. (No model.)

*To all whom it may concern:*

Be it known that I, GEORGE W. WAITT, of Camden, county of Camden, State of New Jersey, have invented certain Improvements and Methods for the Concentration and Amalgamation of Ores; and I do hereby declare that the following is a full and true description thereof.

This invention relates to an improvement in devices for saving the mineral portion of pulverized gold and silver bearing ores, by assisting concentration and amalgamation, and with special reference to the following improvements: first, to assist in the concentration of the mineral by causing the finely-pulverized particles to settle down out of the muddy slimes after leaving the battery and before reaching the concentrator; second, in connection with this settling operation, to separate a portion of the muddy water from the pulp before it reaches the concentrating-machine; third, while the pulp or pulverized ore is in an agitated condition, in compelling it to travel up over a more or less inclined amalgamated or quicksilvered surface for the purpose of amalgamating the free minerals; also, in saving the float-gold by amalgamated plates placed above the amalgamated bed, the table being constructed to effect the above results either singly or all combined, and before the pulp passes to a concentrating device, as will be more fully explained.

The ordinary means at present in use for saving the free and base mineral portions of pulverized ores by concentration and amalgamation is to allow the pulp, as it comes from the battery, to float down over an inclining amalgamated or quicksilvered plate for amalgamating the free gold or other amalgamable mineral, and after leaving this plate the pulp passes on to the concentrator for saving such mineral portion as passes the amalgamated plate. An excess of water coming onto the concentrator has been found detrimental to saving the finely-pulverized mineral portion of the ore by flooding it off with the muddy gangue matter, as will be more fully explained. Ore pulp as it comes from the battery has the appearance of muddy water, because the ore is so finely pulverized in the battery that the particles are held in suspension in the water which is used to wash them through the screens. The heavy particles which compose the valuable portions of the ore soon settle to the bottom, leaving the muddy water on top; but a large quantity of worthless material also settles to the bottom, so that the valuable particles are mingled with a considerable portion of gangue or worthless particles. The particles which are held in suspension in the superstratum of muddy water, however, are as a general thing comparatively worthless. The purpose of concentration is to separate the valuable particles from the worthless particles, and for this purpose as much clear water should be used as possible to wash away the lighter gangue matter and leave or save the heavier mineral particles. This superstratum of muddy water is in the way, because when it is present the clear water cannot be brought into immediate contact in such quantities as it should be with the substratum of pulp. It will not do, however, to draw off the entire superstratum of water, because a certain quantity is needed to keep the pulp in a free condition to move and prevent it from packing; but a large quantity of the muddy superstratum of water can be drawn off with a decided benefit to the concentrating process. This I call the excess of pulp-water.

My invention consists in the employment of a separate and independent draining-table and amalgamator interposed between the battery and a concentrating table or machine and driven by a separate and independent mechanism, into and through which the pulp is caused to pass on its way from the battery to the concentrating table or surface, and in which the excess of water is separated and drawn off from the pulp, while the pulp and a portion of the battery-water passes on to the concentrator in a fit condition to be acted upon by the clean water, all as hereinafter more fully described.

Referring to the accompanying drawings, Figure 1 is a side elevation, showing the relative arrangement of the battery, draining and amalgamating table, and concentrator. Fig. 2 is a perspective of the draining-table, showing the arrangement of the draining-pipes and amalgamating-plates.

Let A represent the mortar of a stamp-battery, and B the apron, plate, or sluice which conducts the pulp from the battery to the draining and amalgamating table C.

D is a concentrating-table.

For the purpose of this specification I have represented an Imlay concentrator; but I do not confine myself to this machine, and wish it distinctly understood that my invention can be used and is equally as beneficial in connection with any style of concentrating table or machine. The draining and amalgamating table C is interposed between the battery and the concentrator, so that the pulp is delivered upon it direct from the battery and from it direct upon the concentrator. Plates or conveying-sluices, however, may intervene between the battery and the draining and amalgamating table, and between this table and the concentrator. The draining and amalgamating table is mounted upon a separate and independent frame, and it is driven by separate and independent mechanism, so that it does its work entirely independent of the concentrator.

The chief object of the table C is to drain the excess of water from the pulp; but its value is increased by employing the amalgamating devices in connection with it, because the pulp is in a favorable condition to have its free particles of gold, quicksilver, and amalgam arrested while it is passing over the table; but the amalgamating devices might be dispensed with and the table be used simply as a draining-table, if preferred.

The table C, I mount upon suitable pivotal bearings, rockers, slides, or rollers, so that it can have a longitudinal or endwise vibration, reciprocation, or shake imparted to it, and when in operation is inclined more or less from the discharge end for excess of water toward the discharge end for pulp. The pulp is delivered upon it near its lower end direct from an apron or sluice, or through a hopper, F, which extends entirely across the table.

The amalgamated plates for catching the float-gold are arranged as represented in Fig. 2—that is, on each side of the hopper F or receiving-space for pulp is an oppositely-inclined amalgamated plate, $g\ g'$, each of which extends from the top of the sides of the table down to near the floor or bottom. The lower end of each plate joins another plate, $h$, or is bent on an angle which extends nearly parallel with this floor or bed of the table, the two plates $h$ extending in opposite directions, leaving a narrow space, more or less, as may be desired, between their under sides and the floor of the table. The pulp is delivered from the hopper or other conductor upon the table between these two amalgamated plates. Other amalgamated plates, $g^2\ g^2$ and $h'\ h'$, similarly constructed and inclined toward the pulp-discharge end of the table, may be arranged at intervals apart, as shown by the drawings. This draining-table is provided with an amalgamated floor or bed for catching the heavier particles of free gold which settle through the pulp. This table can also be used as a draining-table independently from the amalgamating bed and plates when water-drainage only is wanted without amalgamation. The advantage of this as an amalgamator over an ordinary amalgamated plate is, its motion causes the mineral to settle from the pulp more completely, while its forced travel up an inclined surface rubs the free mineral against it and causes the quicksilver to take hold of it. Another advantage is, as the mineral and gangue settle to the bottom or amalgamated bed of the table, it has plenty of moisture to keep the particles free, being all under water, giving the mineral free chance to settle down through the gangue matter and reach the amalgamated plate.

In the lower end of the table C, I secure a number of discharge spouts or pipes, $j\ j$, so that their inner open ends terminate above the amalgamated plate $h$ nearest the end of the table, to prevent any float mineral from getting out with the waste water without being either caught on the plate or becoming submerged in the water and so thoroughly wet that it will sink to the bed of the table. The outer ends of these spouts or pipes discharge into a hopper, K, from which a pipe or sluice, L, leads to the tailing-sluice M.

The motion which I impart to the table is a reciprocating endwise motion, quicker in one direction than the other, so as to cause the pulp to travel toward the upper end of the table, as described in Imlay's patent; but I do not confine myself to the eccentric-gears $p\ p$ for producing this motion, as any other mechanism that will produce a motion which will move the pulp up the incline will answer. The pulp, as before stated, is delivered upon the table between the amalgamated plates $g\ g$, when the motion causes it to swash back and forth between the plates, thus bringing the floating particles of free mineral in contact with the plates. The subsiding pulp is caused by the motion to travel up the inclined amalgamated floor under the amalgamated plates $h$, while the excess of gangue matter held in suspension by it settles to the lower end of the table, and is drawn off through the openings or spouts $j\ j$ and conducted to the tailing-sluice. As these pipes take the water from above the plates $h$ there is no danger of any valuable particles of minerals being drawn off. During the passage of the pulp over the amalgamated bed of the table the particles of free mineral come in contact with it and are amalgamated and saved. The pulp, with its needed proportion of water, then moves forward and is discharged upon the concentrating-table D in a fit condition to be acted upon by the clean water in the concentrator. The quantity of water delivered with the pulp to the concentrator is regulated by raising or lowering the pulp-discharge end of the table.

Having thus described my invention, what I claim, and desire to secure by Letters Patent, is—

1. The method herein described of preparing ore pulp for concentration, the same consisting in simultaneously subjecting the pulp to drainage and agitation while the pulp is moving from the stamp toward the concentrating-table, as set forth.

2. The battery A and concentrator D, in combination with the upwardly-inclined table C, mounted between the battery and concentrator, and provided with means for draining off at the near or lower end of the table the excess of water from the pulp before the pulp is delivered upon the concentrating-table, substantially as described.

3. The battery A and concentrator D, in combination with the upwardly-inclined table C, interposed between the battery and concentrator, and provided with the amalgamating-plates $g\ h$ and $g'\ h'$, and with means for drawing off the excess of water from the pulp before the pulp is delivered upon the concentrating-table, substantially as set forth.

4. The inclined draining-table C, mounted on movable bearings, and mechanism, as described, for operating the same, said table being provided with spouts or drain-pipes $j\ j$, which are introduced through the lower end of the table, in combination with the battery A and spout B, substantially as herein described.

5. The inclined table C, provided with the drain-pipes $j\ j$, and the inclined amalgamated partition-plates $g\ g'$, and horizontal amalgamated plates $h\ h'$, arranged, as specified, so that the pulp is compelled to pass under the horizontal plates, substantially as described.

6. In a preliminary or supplemental draining-table for withdrawing the excess of water from the ore pulp, the inclined plates $g'\ g^2$ and the horizontal plates $h'\ h'$, inclined plate $g$, and horizontal plate $h$, in combination with the drain spouts or tubes $j j$, extending through the sides of said table and having their inner ends projecting over plate $h$, substantially as and for the purpose herein set forth.

In witness whereof I have hereunto set my hand.

GEORGE W. WAITT.

Witnesses:
 CHAS. F. JONES,
 JEREMIAH KNOX.